United States Patent
Uehara

(10) Patent No.: US 9,857,601 B2
(45) Date of Patent: Jan. 2, 2018

(54) DISPLAY DEVICE

(71) Applicant: Japan Display Inc., Tokyo (JP)

(72) Inventor: Toshinori Uehara, Tokyo (JP)

(73) Assignee: Japan Display Inc., Tokyo (JP)

( * ) Notice: Subject to any disclaimer, the term of this patent is extended or adjusted under 35 U.S.C. 154(b) by 138 days.

(21) Appl. No.: 14/198,247

(22) Filed: Mar. 5, 2014

(65) Prior Publication Data

US 2014/0267242 A1  Sep. 18, 2014

(30) Foreign Application Priority Data

Mar. 14, 2013 (JP) .................................. 2013-051771

(51) Int. Cl.
| | |
|---|---|
| *G02B 27/00* | (2006.01) |
| *G06T 17/00* | (2006.01) |
| *G06T 19/00* | (2011.01) |
| *G02B 27/22* | (2006.01) |
| *H04N 13/00* | (2006.01) |
| *H04N 13/04* | (2006.01) |

(52) U.S. Cl.
CPC ..... *G02B 27/2214* (2013.01); *G02B 27/0093* (2013.01); *G06T 17/00* (2013.01); *G06T 19/00* (2013.01); *H04N 13/0022* (2013.01); *H04N 13/0472* (2013.01); *H04N 13/0484* (2013.01)

(58) Field of Classification Search
CPC ......... G06T 19/00; G06T 17/00; G06T 17/20; G02B 27/2214
USPC ......................................................... 345/419
See application file for complete search history.

(56) References Cited

U.S. PATENT DOCUMENTS

| | | | | |
|---|---|---|---|---|
| 5,315,377 | A | * 5/1994 | Isono ..................... | G03B 35/24 345/419 |
| 5,825,541 | A | * 10/1998 | Imai ................... | G02B 27/2214 348/55 |

(Continued)

FOREIGN PATENT DOCUMENTS

| | | |
|---|---|---|
| JP | 3441911 | 9/2003 |
| JP | 2008-146221 | 6/2008 |

(Continued)

OTHER PUBLICATIONS

Office Action dated in corresponding Japanese patent application No. 2013-051771 dated Oct. 20, 2015 with English Translation (6 pages).

*Primary Examiner* — Devona Faulk
*Assistant Examiner* — Hai Tao Sun
(74) *Attorney, Agent, or Firm* — K&L Gates LLP

(57) ABSTRACT

A display device includes: a parallax adjustment unit arranged on a side of a surface of a display unit on which an image is displayed or on a reverse side of the surface, wherein unit areas extending in a first direction are arranged in columns in a second direction in the parallax adjustment unit; and a control unit detecting positions of a right eye and a left eye of a user based on an image of the user, determining a display of pixels of a right eye image and a left eye image to be displayed on the display unit depending on the detected positions of the right eye and the left eye, and determining an area that transmits light among the unit areas included in the parallax adjustment unit depending on the positions of the right eye and the left eye and the display of pixels.

2 Claims, 19 Drawing Sheets

(56) References Cited

U.S. PATENT DOCUMENTS

| | | | |
|---|---|---|---|
| 6,108,029 A * | 8/2000 | Lo | G02B 27/2214 345/419 |
| 7,030,903 B2 | 4/2006 | Sudo | |
| 2004/0008251 A1 * | 1/2004 | Mashitani | H04N 13/0409 348/51 |
| 2005/0129325 A1 * | 6/2005 | Wu | G06T 7/0022 382/254 |
| 2008/0043092 A1 * | 2/2008 | Evans | G02B 27/2214 348/36 |
| 2011/0221747 A1 * | 9/2011 | Kim | H04N 13/0438 345/419 |
| 2014/0098205 A1 | 4/2014 | Usukura et al. | |

FOREIGN PATENT DOCUMENTS

| | | |
|---|---|---|
| JP | 2011151517 | 8/2011 |
| WO | WO2012176445 | 12/2012 |

* cited by examiner

FIG.12
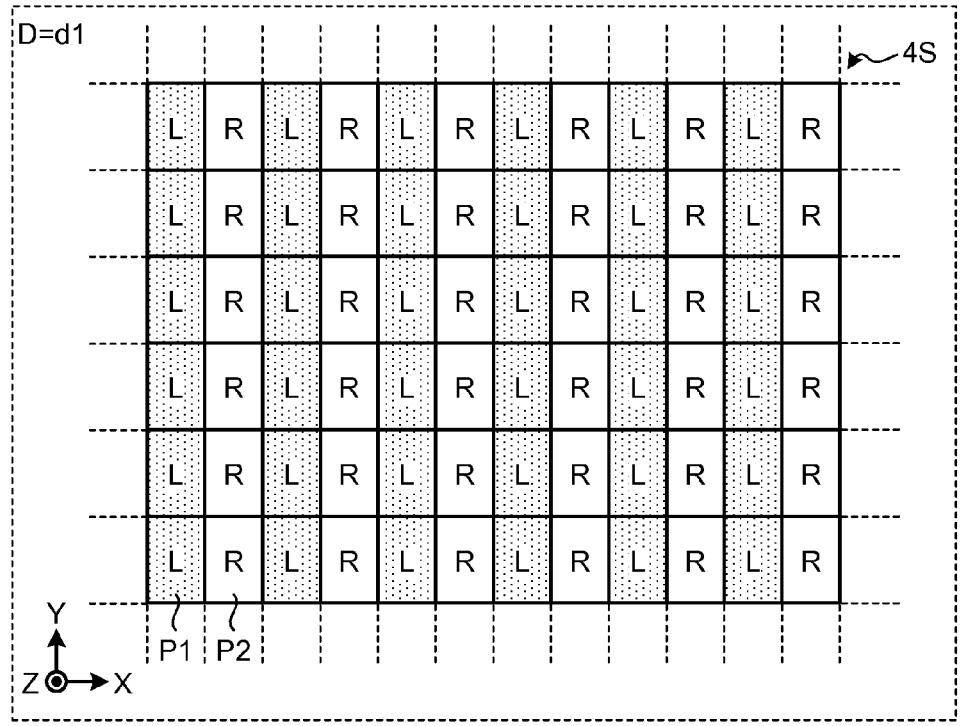
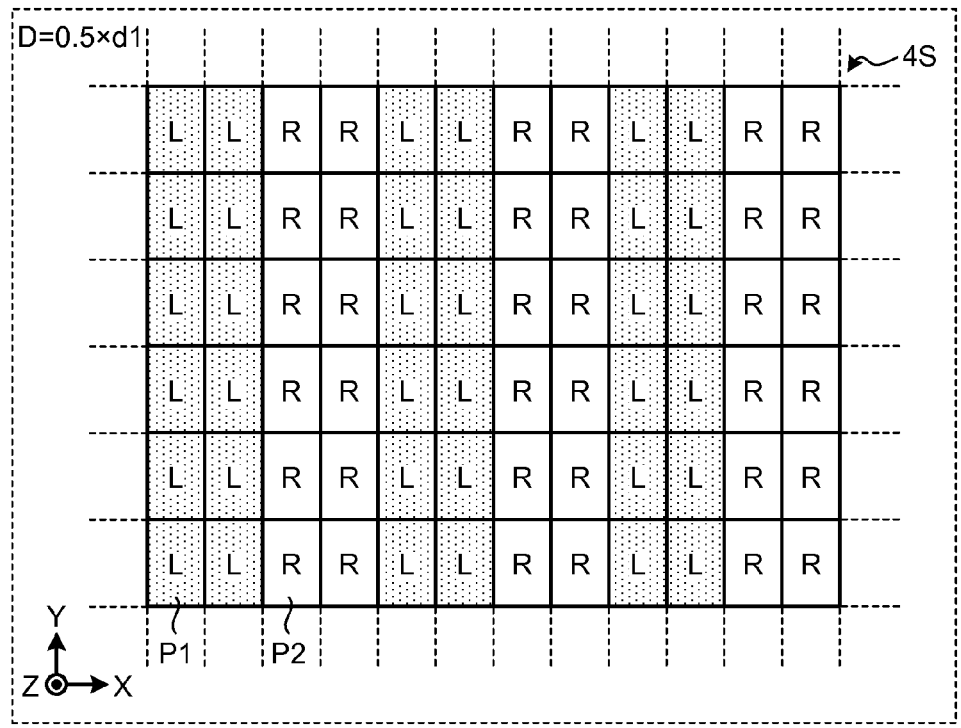

512 FILTER GLASS
510 VIDEO DISPLAY SCREEN UNIT
511 FRONT PANEL

SHUTTER BUTTON 524
FLASH-LIGHT PRODUCING UNIT 521
525 LENS COVER

543 DISPLAY UNIT
542 KEYBOARD
541 MAIN UNIT

551 UPPER CASING
554 DISPLAY
552 LOWER CASING

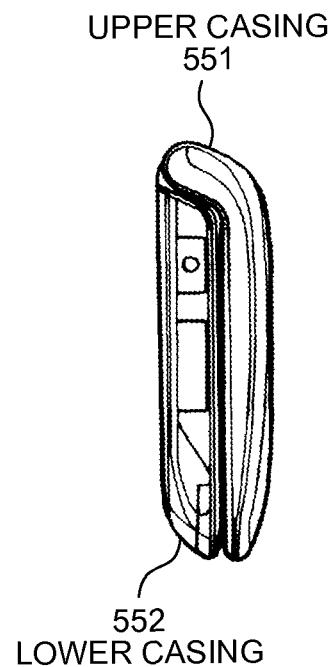
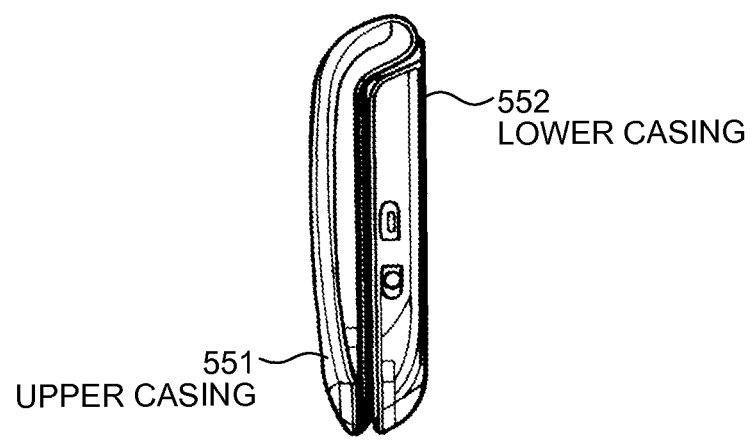
FIG.27

LOWER CASING 552
553 COUPLING UNIT
551 UPPER CASING

UPPER CASING 551
552 LOWER CASING 562
561

DISPLAY DEVICE

CROSS REFERENCES TO RELATED APPLICATIONS

The present application claims priority to Japanese Priority Patent Application JP 2013-051771 filed in the Japan Patent Office on Mar. 14, 2013, the entire content of which is hereby incorporated by reference.

BACKGROUND

1. Technical Field

The present disclosure relates to a display device.

2. Description of the Related Art

In recent years, the development of a display device that realizes a stereoscopic image display, in other words, a three-dimensional image display device that can display an image which can be three-dimensionally viewed by a user serving as a viewer (a three-dimensional image) has been promoted. For example, the three-dimensional image display device realizes a display of a three-dimensional image by employing binocular parallax. For example, the three-dimensional image display device generates a right eye image and a left eye image. The three-dimensional image display device controls a so-called "barrier unit" that is arranged on a side of a display surface of a display unit on which an image is displayed, thereby performing an adjustment so that the right eye image displayed on the display unit enters a right eye of a user and the left eye image displayed on the display unit enters a left eye of the user. In this way, the three-dimensional image display device realizes the display of a three-dimensional image.

The three-dimensional image display device performs an adjustment so that a right eye image enters a right eye of a user and a left eye image enters a left eye of the user, thereby realizing a display of a three-dimensional image. When positions of the right eye and the left eye of the user who views an image are shifted, for example, there are problems that the right eye image enters the left eye and the user has a feeling of strangeness and an uncomfortable feeling. Therefore, an attempt of maintaining the quality of a three-dimensional image in consideration with a shift in the positions of the right eye and the left eye of the user has been made. For example, Japanese Patent Application Laid-Open Publication No. 2008-146221 discloses an image display system that calculates relative positions of a right eye and a left eye of a user with respect to an image display device to generate an image depending on the relative positions of the right eye and the left eye. Japanese Patent Publication No. 3441911 discloses a technique of executing control so that placing of a stripe parallax image of a stereoscopic image displayed in a window is suitable for a display device.

Besides, there is a problem such that, when positions of a right eye and a left eye of a user are moved back and forth, in other words, when the positions of the right eye and the left eye are moved in a direction that the user moves toward or away from a display of a three-dimensional image, it is difficult to execute control of realizing a display of a three-dimensional image.

SUMMARY

According to an aspect, a display device comprises: a parallax adjustment unit that is arranged on a side of a surface of a display unit on which an image is displayed or on a reverse side of the surface, wherein a plurality of unit areas extending in a first direction are arranged in columns in a second direction in the parallax adjustment unit; and a control unit that detects positions of a right eye and a left eye of a user based on an image of the user, determines a display of pixels of a right eye image and a left eye image to be displayed on the display unit depending on the detected positions of the right eye and the left eye, and determines an area that transmits light among the unit areas included in the parallax adjustment unit depending on the positions of the right eye and the left eye and the display of pixels.

Additional features and advantages are described herein, and will be apparent from the following Detailed Description and the figures.

BRIEF DESCRIPTION OF THE FIGURES

FIG. 12 illustrates an example of a change in a display of pixels of a right eye image and a left eye image by a control unit;

FIG. 26 illustrates another example of an electronic apparatus including the display device according to the embodiment;

FIG. 27 illustrates another example of an electronic apparatus including the display device according to the embodiment;

DETAILED DESCRIPTION

Modes (embodiments) for carrying out a display device of the present disclosure will be explained in detail with reference to the accompanying drawings. The present disclosure is not limited to the contents described in the following embodiments. Constituent elements described in the following explanations include those that can be easily conceived by persons skilled in the art and that are substantially identical. In addition, constituent elements described in the following explanations can be combined as appropriate. Explanations are made with the following order.
1. Embodiment (Display device)
2. Application example (Electronic apparatus)
Example in which a display device according to the above embodiments is applied to an electronic apparatus
3. Configuration of the Present Disclosure 1. Embodiment For example, a display device according to an embodiment of the present disclosure can be applied to a display device that controls a barrier unit stacked on a display unit to display a three-dimensional image. Examples of the display unit of the display device include a liquid crystal display (LCD) panel and MEMS (Micro Electro Mechanical Systems).

The display device according to the present embodiment can be applied to both a monochrome-display compatible display device and a color-display compatible display device. In a case of the color-display compatible display device, one pixel (a unit pixel) that serves as the unit of measure for forming a color image is configured by plural sub-pixels. More specifically, in the color-display compatible display device, one pixel is configured by three sub-pixels including a sub-pixel that displays a red color (R), a sub-pixel that displays a green color (G), and a sub-pixel that displays a blue color (B), for example.

One pixel is not limited to a combination of sub-pixels of three RGB primary colors, and it is also possible to configure one pixel by further adding a sub-pixel of one color or sub-pixels of plural colors to the sub-pixels of three RGB primary colors. More specifically, it is also possible to configure one pixel by adding a sub-pixel that displays a white color (W) in order to improve the brightness, or to configure one pixel by adding at least one sub-pixel that displays a complementary color in order to enlarge the color reproduction range, for example.

Configuration

Figure 1:
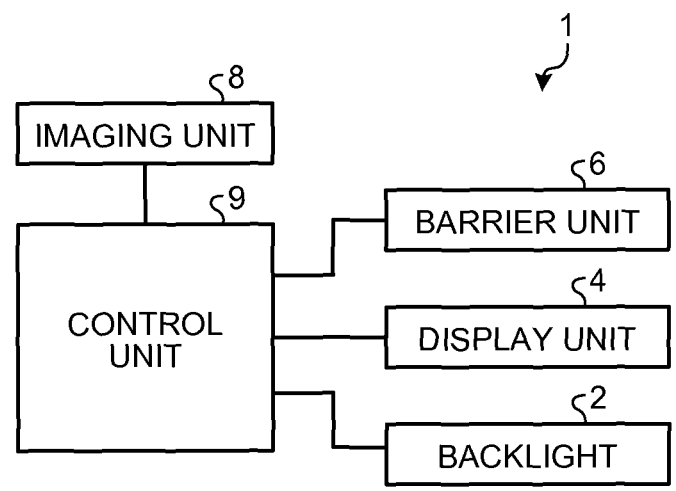
FIG. 1 is a block diagram of an example of a functional configuration of a display device according to an embodiment of the present disclosure.
Figure 2:
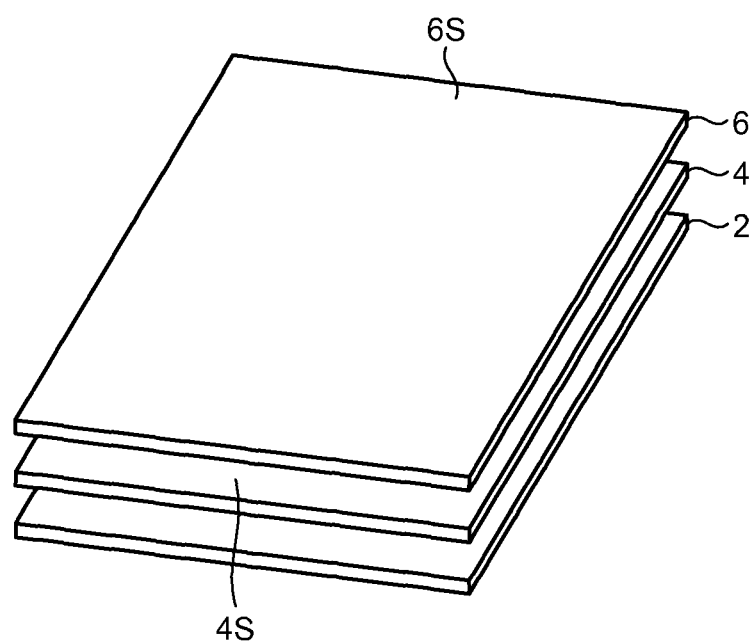
FIG. 2 is a perspective view of an example of a configuration of a backlight, a display unit, and a barrier unit of the display device illustrated in FIG. 1.
Figure 3:
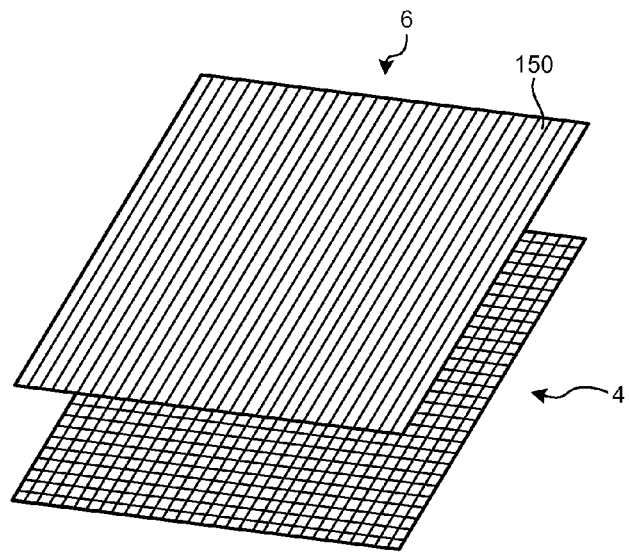
FIG. 3 is a perspective view illustrating a relationship between pixels of the display unit and unit areas of the barrier unit.

FIG. 1 is a block diagram of an example of a functional configuration of a display device according to the present embodiment. FIG. 2 is a perspective view of an example of a configuration of a backlight, a display unit, and a barrier unit of the display device illustrated in FIG. 1. FIG. 3 is a perspective view illustrating a relationship between pixels of the display unit and unit areas of the barrier unit. FIGS. 2 and 3 schematically illustrate dimensions and shapes, which are therefore not necessarily identical to the actual dimensions and shapes. A display device 1 illustrated in FIG. 1 is an example of the display device according to the present disclosure. A barrier unit 6 illustrated in FIG. 1 is an example of a parallax adjustment unit according to the present disclosure.

For example, the display device 1 displays an image that can be recognized as a three-dimensional image by a user who views a screen from a predetermined position by the naked eye. As illustrated in FIG. 1, the display device 1 includes a backlight 2, a display unit 4, the barrier unit 6, an imaging unit 8, and a control unit 9. In the display device 1, the backlight 2, the display unit 4, and the barrier unit 6 are stacked in this order, for example.

The backlight 2 is a planar illuminating device that emits planar light toward the display unit 4. The backlight 2 includes a light source and a light guide plate for example, and outputs light emitted by the light source from its emitting surface facing the display unit 4 through the light guide plate while scattering the light.

The display unit 4 is a display device that displays an image. The display unit 4 is a liquid crystal panel on which many pixels are arranged in a two-dimensional array as illustrated in FIG. 3. Light emitted from the backlight 2 enters into the display unit 4. The display unit 4 displays an image on a display surface (4S in FIG. 2, for example) by switching between transmitting light and blocking light that enters into each pixel.

The barrier unit 6 is arranged on the display surface (for example, 4S in FIG. 2) on which an image of the display unit 4 is displayed, that is, on a surface opposite to a surface that faces the backlight 2. As illustrated in FIG. 3, in the barrier unit 6, a plurality of unit areas 150 extending in a second direction are arranged in columns in a first direction that is perpendicular to the second direction. The barrier unit 6 is a liquid crystal panel and applies a voltage partially to a target transmission area or light blocking area to orient towards liquid crystals, thereby switching between transmission of light that enters into each unit area 150 from a light emitting surface (for example, 6S in FIG. 2) and blocking thereof. In this way, the barrier unit 6 adjusts an area that transmits an image to be displayed on the display unit 4 and an area that blocks the image in the second direction. The barrier unit 6 according to the present embodiment is an example of the parallax adjustment unit.

The imaging unit 8 is an apparatus that captures an image such as a camera. For example, a display device that controls the barrier unit 6 to display a three-dimensional image employs so-called "head tracking technique" and "eye tracking technique", and the like. The head tracking and eye tracking techniques employ a technique of capturing an image of a user by the imaging unit 8 to detect or measure positions of eyes of the user in the image.

The control unit 9 controls operations of the respective units of the display device 1. Specifically, the control unit 9 controls switching on and off of the backlight 2, the amount and intensity of light while the backlight 2 is switched on, an image displayed on the display unit 4, an operation (transmission/blocking) of each unit area 150 of the barrier unit 6, and an imaging operation of the imaging unit 8. The control unit 9 controls an image displayed on the display unit 4 and the operation (transmission/blocking) of each unit area 150 of the barrier unit 6 to realize a display of a three-dimensional image. The control unit 9 according to the present embodiment is an example of a control unit.

For example, the control unit 9 includes a CPU (Central Processing Unit) serving as a computation device and a memory serving as a storage device. By using these hardware resources to execute a program, the control unit 9 can also realize various functions. Specifically, the control unit 9 reads a program that is stored in a predetermined storage unit (not shown), develops the program in the memory, and causes the CPU to execute commands included in the program developed in the memory. Depending on a result of execution of the commands by the CPU, the control unit 9 controls switching on and off of the backlight 2, the amount and intensity of light while the backlight 2 is switched on, an image displayed on the display unit 4, and the operation (transmission/blocking) of each unit area 150 of the barrier unit 6.

A display of a three-dimensional image by the control unit 9 according to the present embodiment is explained. The control unit 9 detects positions of a right eye and a left eye of a user based on an image acquired from the imaging unit 8. The control unit 9 determines a display of pixels of a right eye image and a left eye image displayed on the display unit 4 depending on the positions of the right eye and the left eye of the user (a distance between the display device 1 and the positions of the right eye and the left eye). Depending on the positions of the right eye and the left eye of the user and the display of pixels, the control unit 9 determines the unit area 150 that transmits light and the unit area 150 that blocks light among the respective unit areas 150 of the barrier unit 6. That is, the control unit 9 controls light transmission of the barrier unit 6 so that the right eye image is viewed by the right eye of the user and the left eye image is viewed by the left eye of the user via the unit areas 150 of the barrier unit 6. In this way, the display device 1 displays an image that is viewed three-dimensionally by the user.

(Display Unit 4 and Barrier Unit 6)

Figure 4:
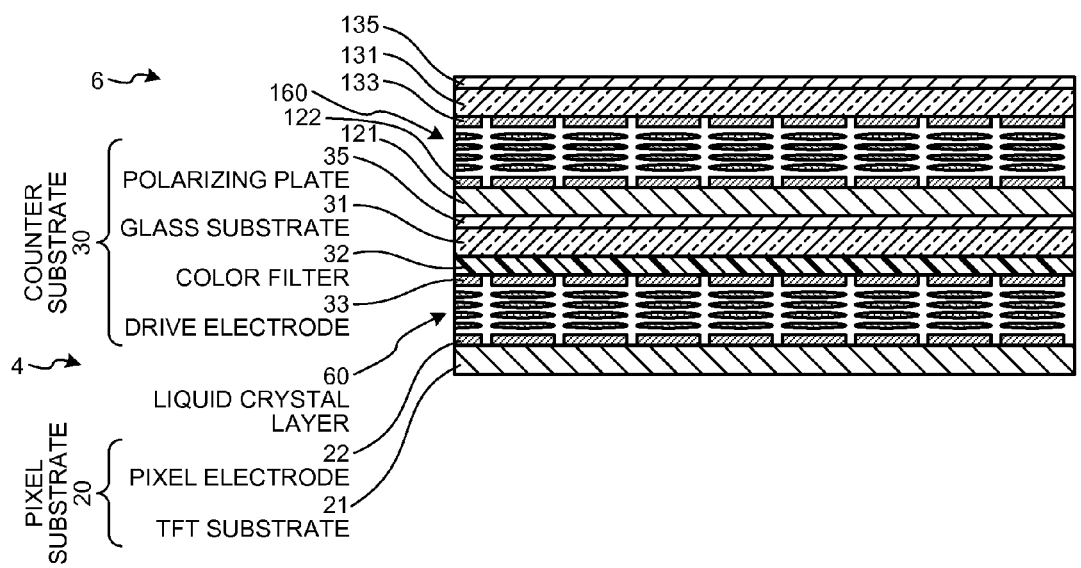
FIG. 4 is a cross-sectional view of a schematic cross-sectional structure of a module in which a display unit and a barrier unit are incorporated.
Figure 5:
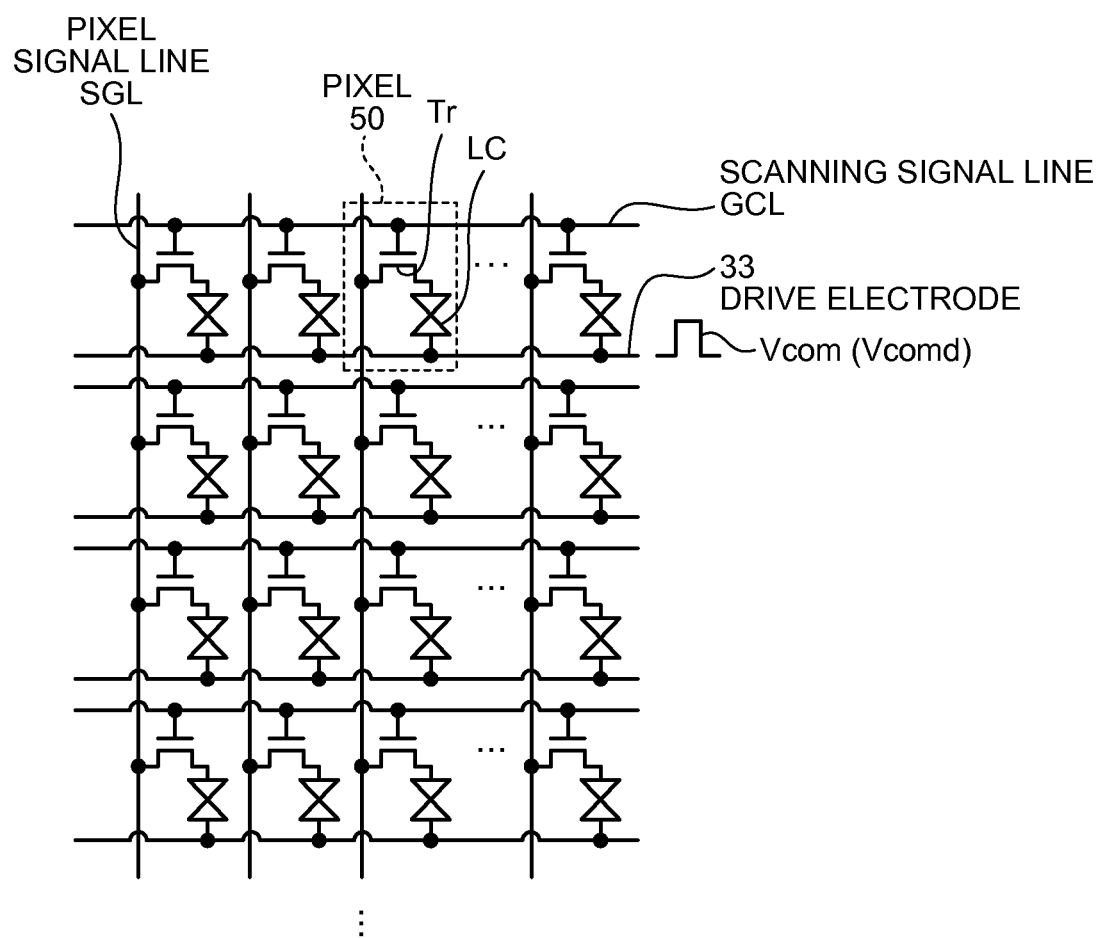
FIG. 5 is a circuit diagram illustrating display of pixels on the display unit.
Figure 6:
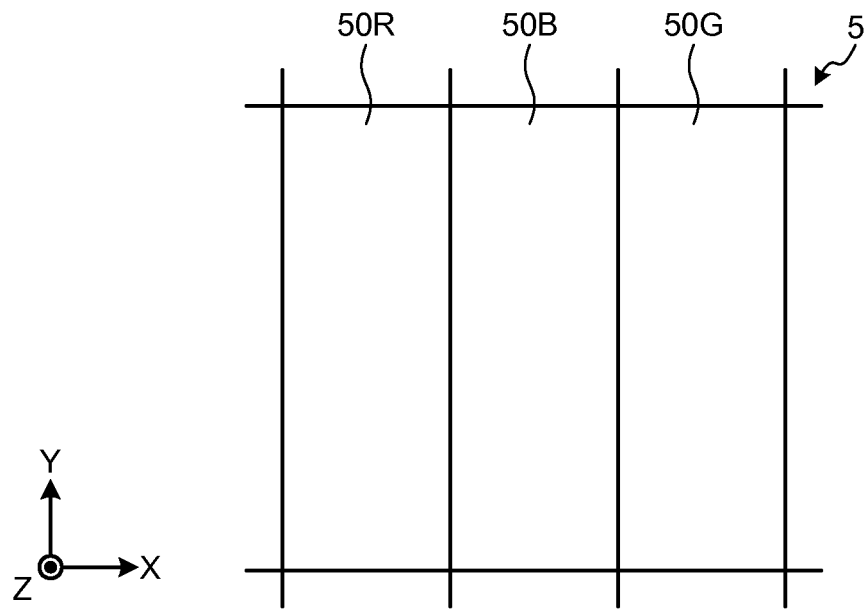
FIG. 6 is a schematic diagram of a pixel for color display.
Figure 7:
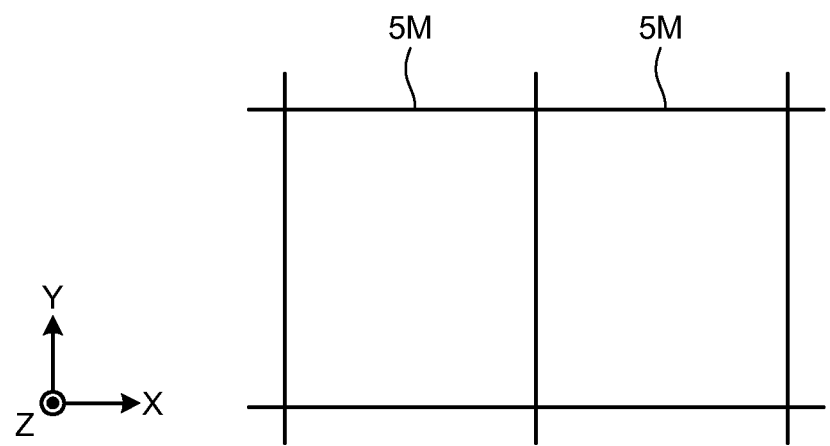
FIG. 7 is a schematic diagram of a pixel for monochrome display.

Next, a configuration example of the display unit 4 and the barrier unit 6 is explained. FIG. 4 is a cross-sectional view of a schematic cross-sectional structure of a module in which a display unit and a barrier unit are incorporated. FIG. 5 is a circuit diagram illustrating display of pixels on the display unit. FIG. 6 is a schematic diagram of a pixel for color display. FIG. 7 is a schematic diagram of a pixel for monochrome display.

As illustrated in FIG. 4, the display device 1 is configured by stacking the barrier unit 6 on the display unit 4. The display unit 4 includes a pixel substrate 20, a counter substrate 30 that is arranged to be opposed to the pixel substrate 20 in a direction vertical to the surface of the pixel substrate 20, and a liquid crystal layer 60 that is inserted between the pixel substrate 20 and the counter substrate 30.

The pixel substrate 20 includes a TFT substrate 21 that serves as a circuit board, and a plurality of pixel electrodes 22 that are provided in a matrix on the TFT substrate 21. In the TFT substrate 21, a wiring of a TFT (Thin Film Transistor) element Tr of each pixel 50 illustrated in FIG. 5, a wiring of a pixel signal line SGL that supplies a pixel signal to each of the pixel electrodes 22, a wiring of a scanning signal line GCL that drives the TFT element Tr, and other wirings are formed. As described above, the pixel signal line SGL extends on a plane parallel to a surface of the TFT substrate 21, and supplies a pixel signal for displaying an image to a pixel. The pixel substrate 20 illustrated in FIG. 5 includes a plurality of pixels 50 that are arrayed in a matrix. Each of the pixels 50 includes the TFT element Tr and a liquid crystal element LC. In an example illustrated in FIG. 5, the TFT element Tr is configured by an n-channel MOS (Metal Oxide Semiconductor) type TFT element. A source of the TFT element Tr is connected to the pixel signal line SGL. A gate of the TFT element Tr is connected to the scanning signal line GCL. A drain of the TFT element Tr is connected to one end of the liquid crystal element LC. One end of the liquid crystal element LC is connected to the drain of the TFT element Tr, and the other end is connected to a drive electrode 33.

The pixel 50 and another pixel that belong to the same row on the pixel substrate 20 are connected to each other by the scanning signal line GCL. The scanning signal line GCL is connected to a gate driver, and is supplied with a scanning signal (Vscan) from the gate driver. The pixel 50 and another pixel that belong to the same column on the pixel substrate 20 are connected to each other by the pixel signal line SGL. The pixel signal line SGL is connected to a source driver, and is supplied with a pixel signal (Vpix) from the source driver. Further, the pixel 50 and another pixel that belong to the same column on the pixel substrate 20 are connected to each other by the drive electrode 33. The drive electrode 33 is connected to a drive-electrode driver, and is supplied with a drive signal (Vcom) from the drive-electrode driver. That is, in an example illustrated in FIG. 5, a plurality of pixels 50 that belong to the same row share one drive electrode 33.

The display unit 4 applies the scanning signal (Vscan) from the gate driver to the gate of the TFT element Tr of the pixel 50 through the scanning signal line GCL illustrated in FIG. 5, and therefore sequentially selects one row (one horizontal line) of the pixels 50 formed in a matrix on the pixel substrate 20 as a display drive target. The display unit 4 supplies the pixel signal (Vpix) from the source driver to each of pixels 50 that constitute one horizontal line sequentially selected, through the pixel signal line SGL illustrated in FIG. 5. On the pixels 50, one-horizontal-line display is performed according to the pixel signal (Vpix) supplied. The display unit 4 applies the drive signal (Vcom) to drive the drive electrode 33.

As described above, the display unit 4 drives the scanning signal line GCL so as to perform line sequential scanning in a time-division manner, and therefore sequentially selects one horizontal line. The display unit 4 supplies the pixel signal (Vpix) to pixels 50 that belong to one horizontal line in order to perform display of each horizontal line. Upon performing this display operation, the display unit 4 applies the drive signal (Vcom) to a block that includes the drive electrode 33 that corresponds to the displayed one horizontal line.

The counter substrate 30 includes a glass substrate 31, a color filter 32 that is formed on one surface of the glass substrate 31, and a plurality of drive electrodes 33 that are formed on the surface of the color filter 32 opposite to the glass substrate 31. On the other surface of the glass substrate 31, a polarizing plate 35 is provided. The barrier unit 6 is stacked on the surface of the polarizing plate 35 opposite to the surface on the side of the glass substrate 31.

The color filter 32 periodically arrays color filters that are respectively colored by three colors including red (R), green (G), and blue (B) colors for example, and brings each of the pixels 50 illustrated in FIG. 5 into correspondence with a set of the three RGB colors. More specifically, as illustrated in FIG. 6, one pixel that serves as the unit of measure for forming a color image, that is the unit pixel 5, includes a plurality of sub-pixels, for example. In this example, the unit pixel 5 includes a sub-pixel 50R that displays R, a sub-pixel 50B that displays B, and a sub-pixel 50G that displays G. The sub-pixels 50R, 50B, and 50G included in the unit pixel 5 are arrayed in the X direction, that is, in the row direction of the display device 1. The color filter 32 is opposed to the liquid crystal layer 60 in a direction perpendicular to the surface of the TFT substrate 21. The color filter 32 can be colored by another color combination as long as the color filter 32 is colored by colors different from each other.

The unit pixel 5 can further include a sub-pixel of one color or sub-pixels of plural colors. In a case where a liquid crystal display device is only compatible with monochrome display, one pixel that serves as the unit of measure for forming a monochrome image, that is a unit pixel 5M, is equivalent to the pixel 50 (a sub-pixel of a color image), as illustrated in FIG. 7. The unit pixel 5 is a basic unit for displaying a color image. The unit pixel 5M is a basic unit for displaying a monochrome image.

The drive electrodes 33 according to the present embodiment function as common drive electrodes (counter electrodes) of the display unit 4. In the present embodiment, one drive electrode 33 is arranged so as to correspond to one pixel electrode 22 (the pixel electrode 22 that constitutes one row). The drive electrodes 33 can be a plate electrode that is common to the pixel electrodes 22. The drive electrodes 33 according to the present embodiment are opposed to the pixel electrodes 22 in a direction perpendicular to the surface of the TFT substrate 21, and extend in a direction parallel to the direction in which the pixel signal line SGL extends. A drive signal having an AC rectangular waveform is applied from the drive-electrode driver to the drive electrodes 33 through a contact conductive pillar (not illustrated) with conductive properties.

The liquid crystal layer 60 modulates light passing through it according to a state of an electric field, and uses various liquid-crystal modes such as TN (Twisted Nematic), VA (Vertical Alignment), and ECB (Electrically Controlled Birefringence).

Respective alignment films are provided between the liquid crystal layer 60 and the pixel substrate 20 and between the liquid crystal layer 60 and the counter substrate 30. An incident-side polarizing plate can also be arranged on the bottom-surface side of the pixel substrate 20.

In the barrier unit 6, a TFT substrate 121 that serves as a circuit board, a plurality of unit-area electrodes 122 that are provided in columns on the TFT substrate 121, a glass substrate 131, a plurality of drive electrodes 133 that are arranged on one surface of the glass substrate 131 on the side of the unit-area electrodes 122, and a polarizing plate 135 that is arranged on the other surface of the glass substrate 131 are provided. An area interposed between a surface of the glass substrate 131 on the side of the drive electrodes 133 and a surface of the TFT substrate 121 on the side of the unit-area electrodes 122 is filled with a liquid crystal layer 160. The barrier unit 6 basically has the same configuration as the display unit 4 except that the pixel electrodes 22 of the display unit 4 are replaced with the unit-area electrodes 122, and the color filter 32 is not arranged for the barrier unit 6. Respective alignment films are provided between the liquid crystal layer 160 and the TFT substrate 121 and between the liquid crystal layer 160 and the glass substrate 131. An incident-side polarizing plate can also be arranged on the bottom-surface side of the TFT substrate 121, that is, on the side of the display unit 4.

Each of the unit-area electrodes 122 has the same shape as the unit area 150 illustrated in FIG. 3, which is a long thin plate shape extending along a first direction. The unit-area electrodes 122 are arranged in plural columns in a second direction.

The display unit 4 and the barrier unit 6 have the configuration as described above, and respectively change the voltage to be applied to the pixel electrodes 22 and the unit-area electrodes 122 based on a signal from the control unit 9, and therefore display an image that is visually recognized three dimensionally by a user.

(Control Method by Control Unit)

Figure 8:
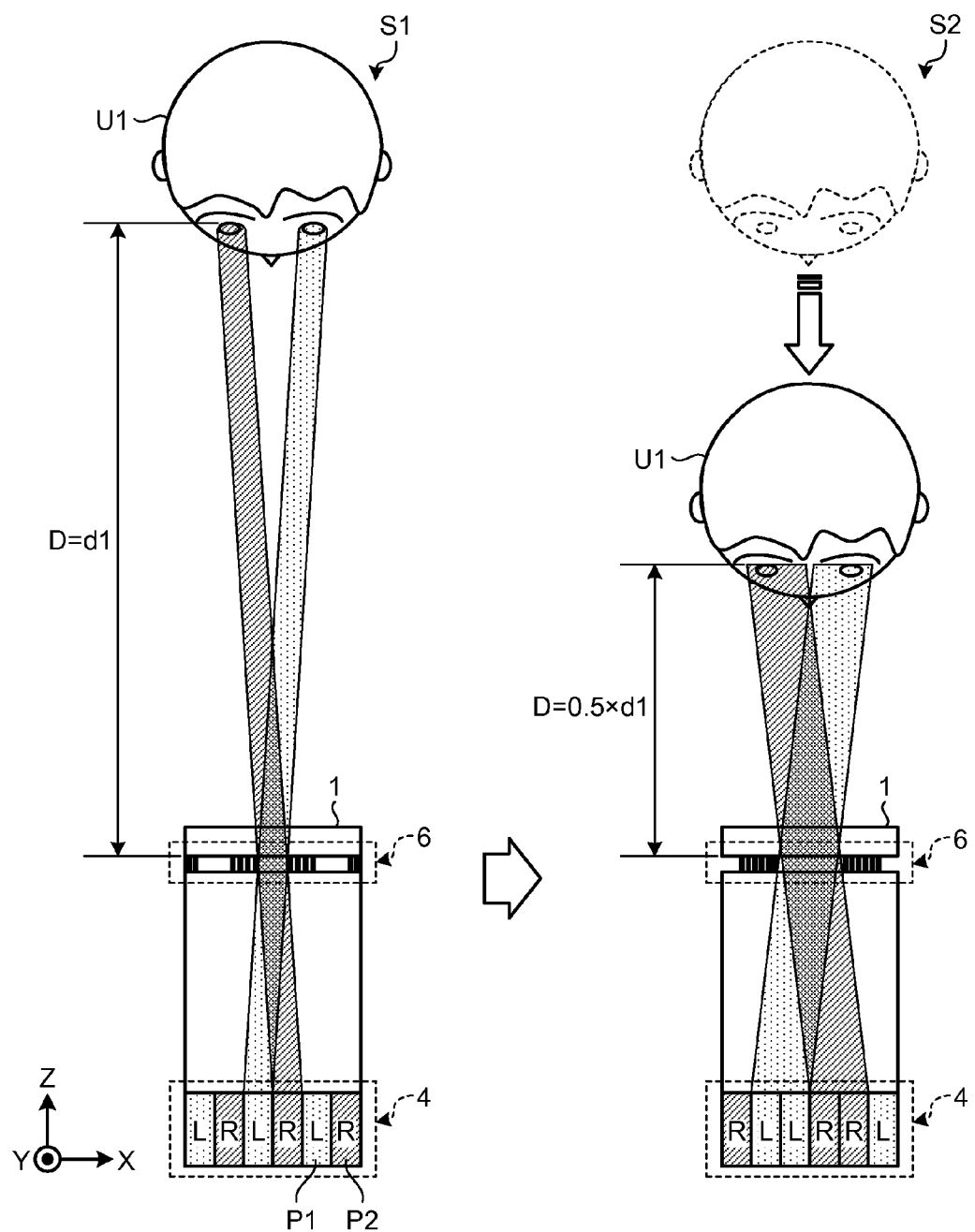
FIG. 8 illustrates a concept of a control method by a control unit according to the embodiment.
Figure 9:
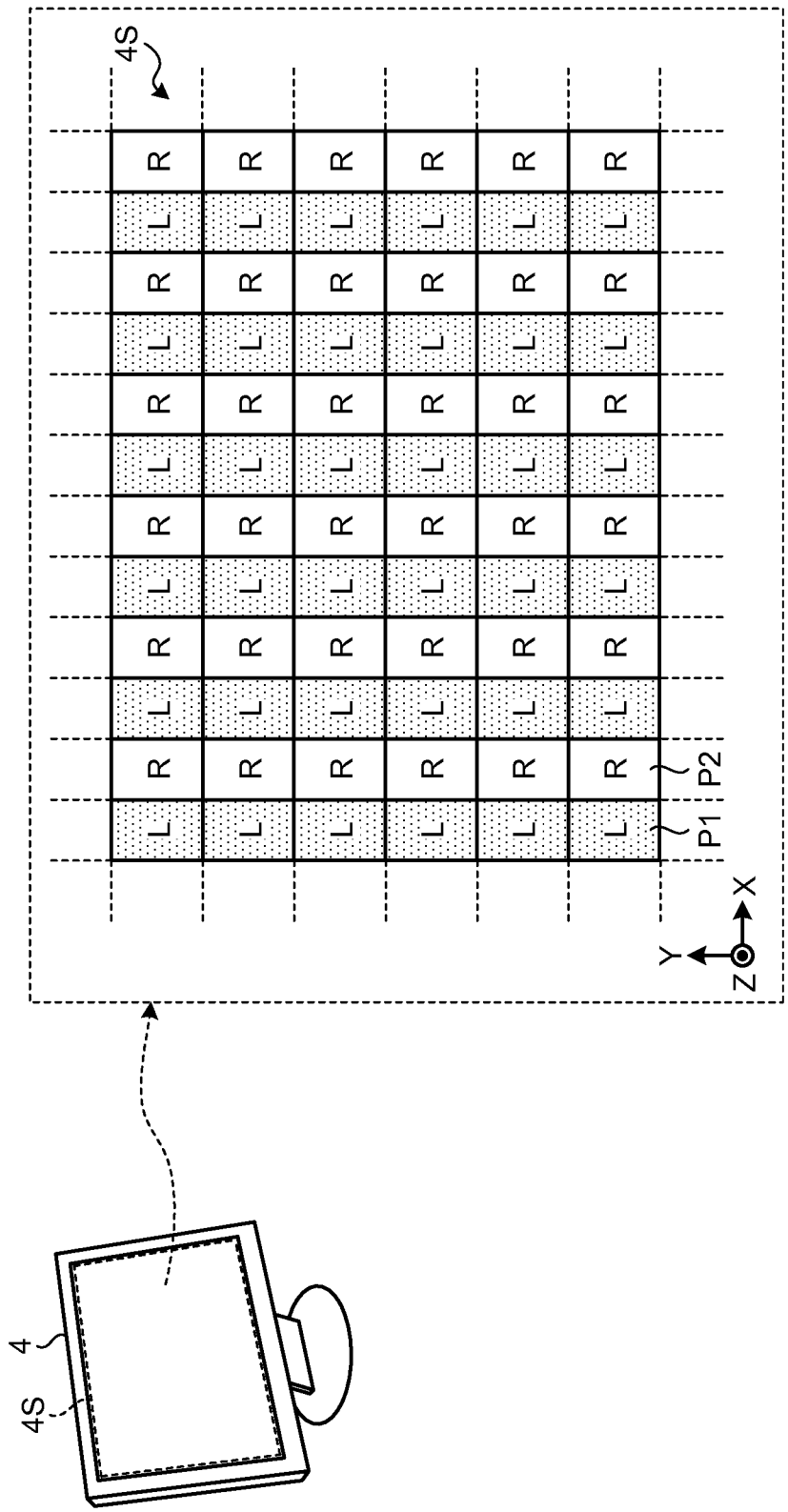
FIG. 9 illustrates an example of a display of pixels of a right eye image and a left eye image displayed on a display unit.
Figure 10:
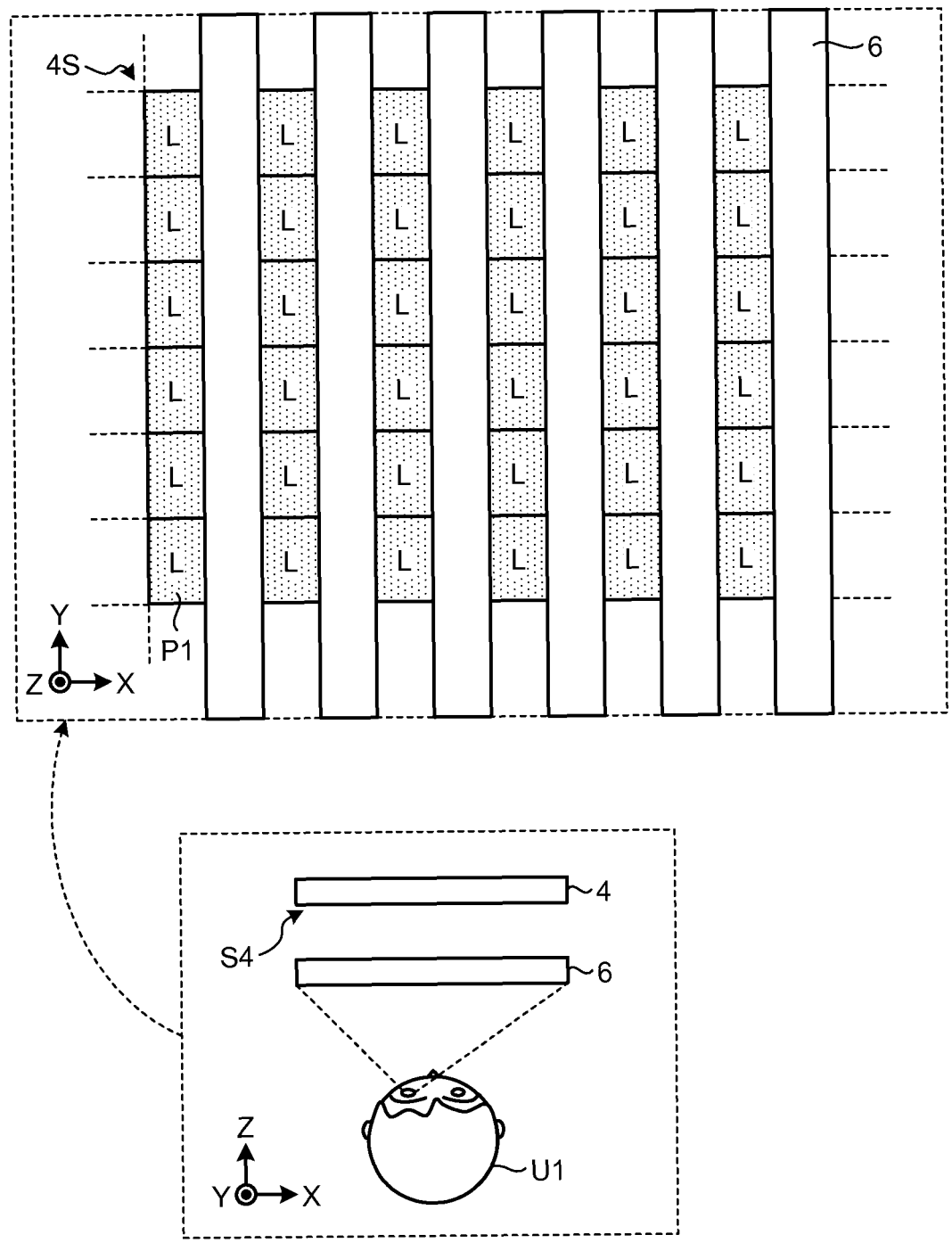
FIG. 10 illustrates a part of a view range that is viewed by a left eye of a user.
Figure 11:
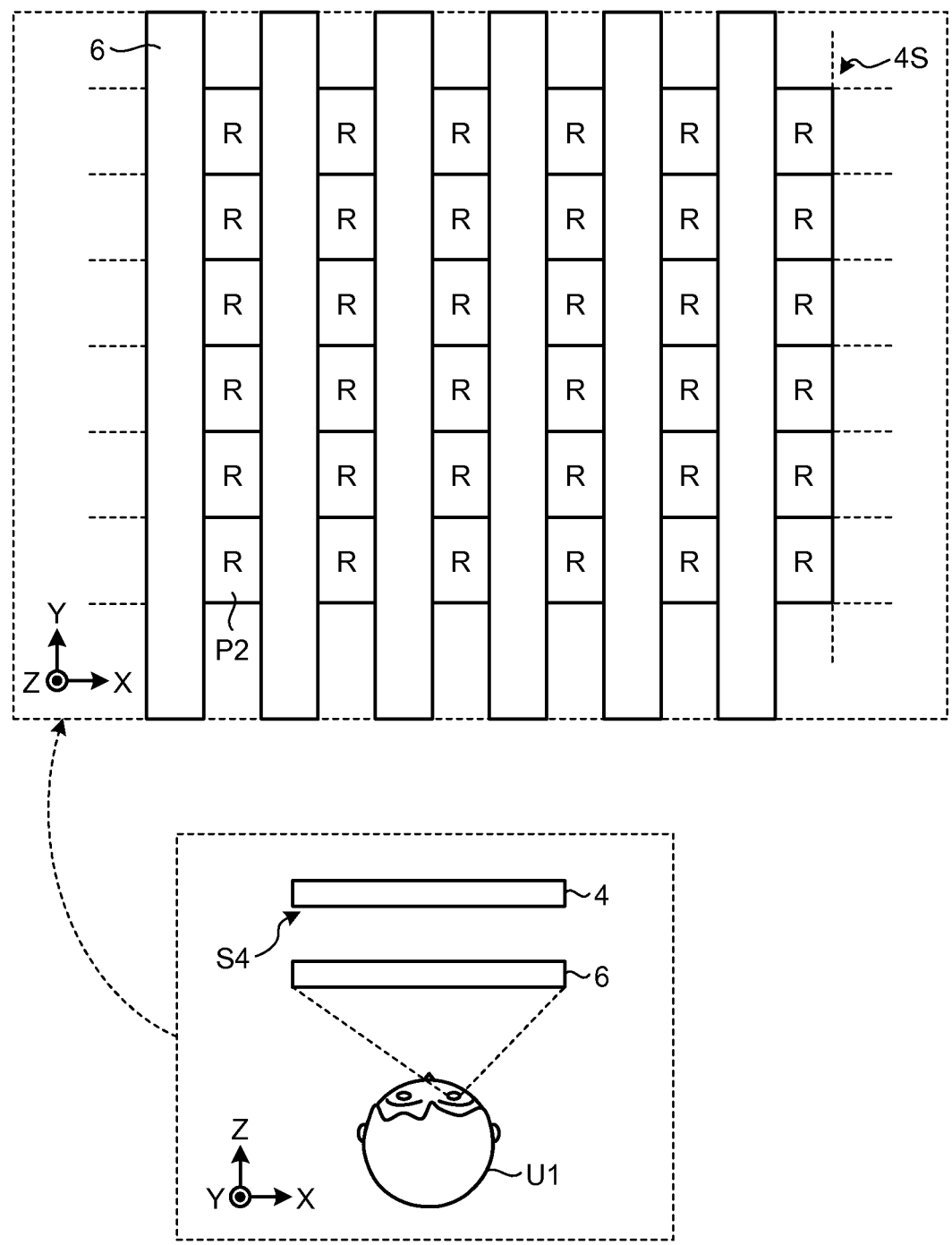
FIG. 11 illustrates a part of a view range that is viewed by a right eye of a user.
Figure 13:
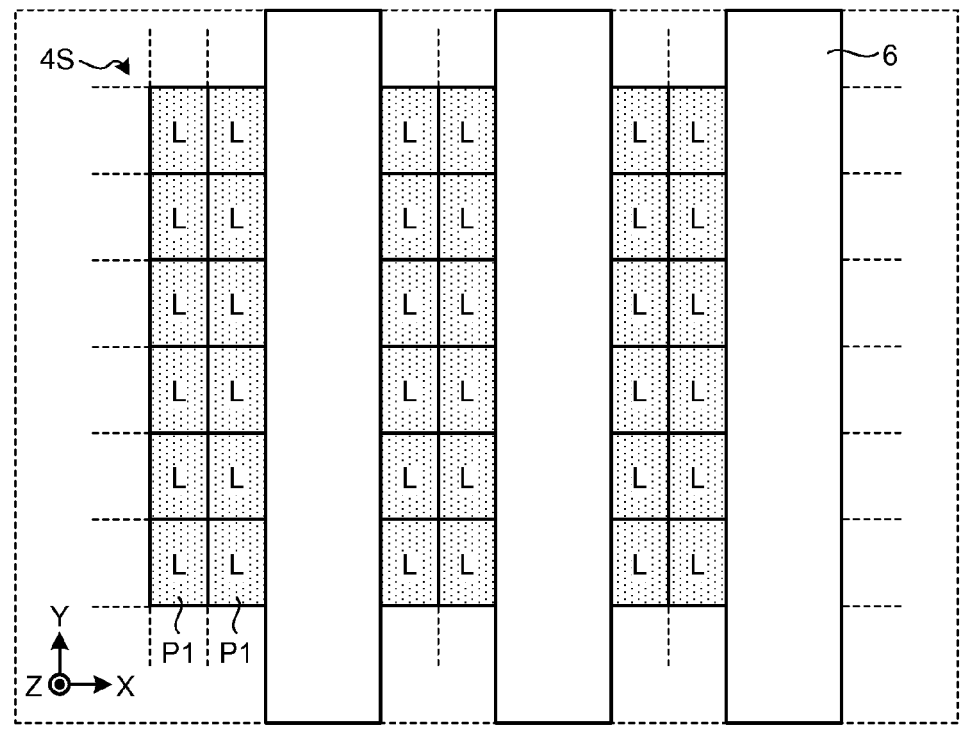
FIG. 13 illustrates a part of a view range that is viewed by a left eye of a user after the change in the display of pixels illustrated in FIG. 12.
Figure 14:
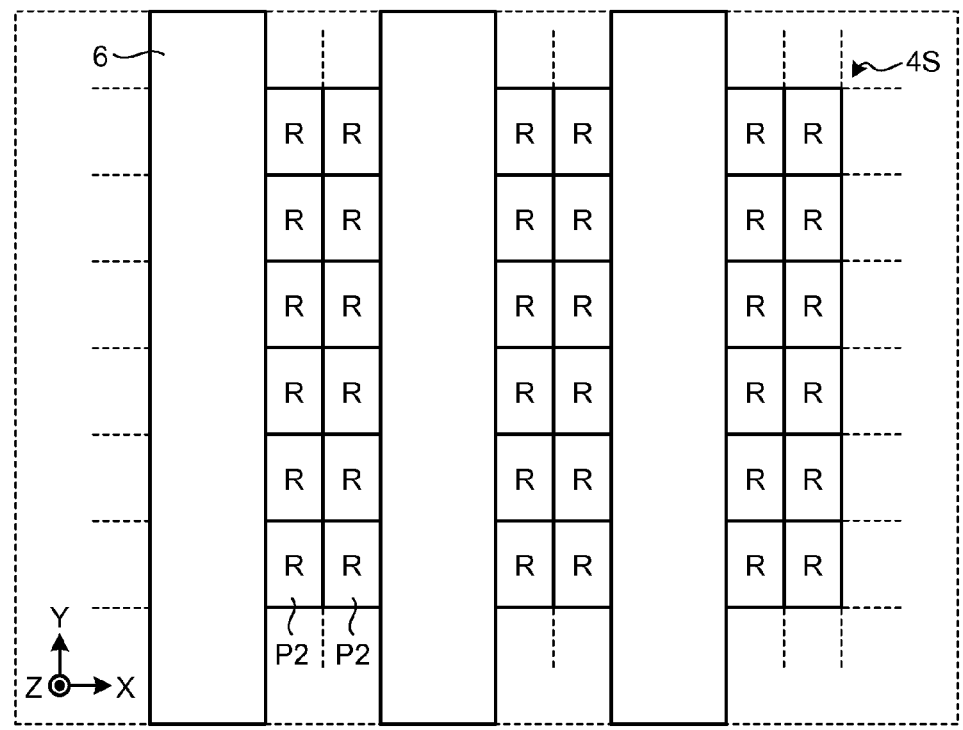
FIG. 14 illustrates a part of a view range that is viewed by a right eye of a user after the change in the display of pixels illustrated in FIG. 12.

A control method by the control unit 9 is specifically explained with reference to FIGS. 8 to 14. FIG. 8 illustrates a concept of a control method by a control unit according to the present embodiment. FIG. 9 illustrates an example of a display of pixels of a right eye image and a left eye image displayed on a display unit. FIG. 10 illustrates a part of a view range that is viewed by a left eye of a user. FIG. 11 illustrates a part of a view range that is viewed by a right eye of a user. FIG. 12 illustrates an example of a change in a display of pixels of a right eye image and a left eye image by the control unit. FIG. 13 illustrates a part of a view range that is viewed by a left eye of a user after the change in the display of pixels illustrated in FIG. 12. FIG. 14 illustrates a part of a view range that is viewed by a right eye of a user after the change in the display of pixels illustrated in FIG. 12.

The control unit 9 detects positions of a right eye and a left eye of a user U1 based on an image of the user captured by the imaging unit 8. The control unit 9 then calculates the distance between the positions of the right eye and the left eye of the user U1 and the display device 1. The distance between the positions of the right eye and the left eye of the user U1 and the display device 1 (the barrier unit 6) can be the shortest distance from the positions of the right eye and the left eye of the user U1 to the barrier unit 6 or can be a contact distance of a direction of a line of sight of the user U1 and the barrier unit 6. For example, it is assumed that, at the time of activation of the display device 1, the control unit 9 calculates in advance the distance between the positions of the right eye and the left eye of the user U1 and the display device 1 as a reference distance for executing control of the display unit 4 and the barrier unit 6. For example, the reference distance corresponds to the distance between the positions of the right eye and the left eye of the user U1 himself and the display device 1 (the barrier unit 6) when the user U1 views an image displayed on the display unit 4. Depending on the distance between the positions of the right eye and the left eye of the user U1 and the display device 1 (the barrier unit 6), the control unit 9 then determines a display of pixels of a right eye image and a left eye image displayed on the display unit 4. Further, depending on the positions of the right eye and the left eye of the user U1 and the display of pixels described above, the control unit 9 determines an area that transmits light (an area that transmits light and an area that blocks light) among the respective unit areas 150 of the barrier unit 6.

For example, as illustrated at Step S1 of FIG. 8, the control unit 9 calculates a distance "D=d1" (a reference distance) between the positions of the right eye and the left eye of the user U1 and the display device 1. For example, as illustrated at Step S1 of FIG. 8, the control unit 9 then determines a display of pixels depending on the calculated distance so that a pixel P1 of a left eye image and a pixel P2 of a right eye image are alternately displayed on the display unit 4. While Step S1 of FIG. 8 illustrates an example of alternately displaying the pixel P1 of the left eye image and the pixel P2 of the right eye image, as long as a user can secure the parallax of the left eye and the right eye, the present embodiment is not limited thereto and any display can be employed. For example, as illustrated at Step S1 of FIG. 8, the control unit 9 then determines an area that transmits light among the respective unit areas 150 of the barrier unit 6 so that, out of the pixel P1 for the left eye and the pixel P2 for the right eye that are alternately displayed on the display unit 4, the pixel P1 for the left eye is viewed via the barrier unit 6 by the left eye of the user U1 and the pixel P2 for the right eye is viewed via the barrier unit 6 by the right eye of the user U1.

At Step S1 of FIG. 8, with the control by the control unit 9, as illustrated in FIG. 9, a column of the pixel P1 of the left eye image that is configured by displaying a plurality of the pixels P1 of the left eye image in a Y-axis direction and a column of the pixel P2 of the right eye image that is configured by displaying a plurality of the pixels P2 of the right eye image in the Y-axis direction are alternately arranged in columns in an X-axis direction on the display surface 4S of the display unit 4. Further, at Step S1 of FIG. 8, with the control by the control unit 9, as illustrated in FIG. 10, an area that transmits light is determined among (the respective unit areas 150 of) the barrier unit 6 so that the pixel P1 for the left eye that is displayed on the display unit 4 is viewed via the barrier unit 6 by the left eye of the user U1. Similarly, with the control by the control unit 9, as illustrated in FIG. 11, an area that transmits light is determined among (the respective unit areas 150 of) the barrier unit 6 so that the pixel P2 for the right eye that is displayed on the display unit 4 is viewed via the barrier unit 6 by the right eye of the user U1.

When the control unit 9 calculates the distance between the positions of the right eye and the left eye of the user U1 and the display device 1 and this distance is different from the distance calculated at Step S1 (the reference distance), the control unit 9 updates a display of pixels on the display unit 4 and light transmission and blocking in the unit area 150 of the barrier unit 6. That is, depending on the distance between the positions of the right eye and the left eye of the user U1 and the display device 1, the control unit 9 changes a display of pixels of a left eye image and a right eye image displayed on the display unit 4 and the unit area 150 that transmits light among the respective unit areas 150 of the barrier unit 6.

For example, as illustrated at Step S2 of FIG. 8, the control unit 9 calculates a distance "D=0.5×d1" between the positions of the right eye and the left eye of the user U1 and the display device 1. For example, as illustrated at Step S2 of FIG. 8, the control unit 9 then changes a display of pixels so that a predetermined number of the pixels P1 of the left eye image are adjacent to each other in the X-axis direction and a predetermined number of the pixels P2 of the right eye image are also adjacent to each other in the X-axis direction. For example, when the distance between the positions of the right eye and the left eye of the user U1 and the display device 1 is 50% of the reference distance, the control unit 9 changes a display of pixels so that two columns of the pixels P1 of the left eye image are adjacent to each other in the X-axis direction and two columns of the pixels P2 of the right eye image are also adjacent to each other in the X-axis direction. Depending on the changed display of pixels and the positions of the right eye and the left eye of the user U1, the control unit 9 then determines an area that transmits light among the respective unit areas 150 of the barrier unit 6 so that the pixel P1 for the right eye is viewed via the barrier unit 6 by the right eye of the user U1 and the pixel P2 for the left eye is viewed via the barrier unit 6 by the left eye of the user U1.

At Step S2 of FIG. 8, with the control by the control unit 9, as illustrated in FIG. 12, a display of pixels is changed as follows. That is, two columns of the pixels P1 of the left eye image configured by displaying a plurality of the pixels P1 in the Y-axis direction are adjacent to each other in the X-axis direction and two columns of the pixels P2 of the right eye image configured by displaying a plurality of the pixels P2 in the Y-axis direction are also adjacent to each other in the X-axis direction, and the two columns of the pixels P1 of the left eye image that are adjacent to each other in the X-axis direction and the two columns of the pixels P2 of the right eye image that are adjacent to each other in the X-axis direction are alternately arranged in columns in the X-axis direction on the display surface 4S of the display unit 4. At Step S2 of FIG. 8, with the control by the control unit 9, as illustrated in FIG. 13, an area that transmits light is changed among (the respective unit areas 150) of the barrier unit 6 so that the pixel P1 for the left eye displayed on the display unit 4 is viewed via the barrier unit 6 by the left eye of the user U1. Similarly, with the control by the control unit 9, as illustrated in FIG. 14, an area that transmits light is changed among (the respective unit areas 150) of the barrier unit 6 so that the pixel P2 for the right eye displayed on the display unit 4 is viewed via the barrier unit 6 by the right eye of the user U1.

At Step S2 of FIG. 8, when the distance between the positions of the right eye and the left eye of the user U1 and the display device 1 (the barrier unit 6) is reduced to 50% of the reference distance illustrated at Step S1 of FIG. 8, the control unit 9 changes a display of pixels so that two pixels of the left eye image are adjacent to each other in the X-axis direction and two pixels of the right eye image are also adjacent to each other in the X-axis direction. In this way, the control unit 9 changes a display of pixels of the left eye image and the right eye image depending on the distance between the positions of the right eye and the left eye of the user U1 and the display device 1 (the barrier unit 6). A method of changing a display of pixels depending on the distance between the positions of the right eye and the left eye of the user U1 and the display device 1 (the barrier unit 6) that is performed by the control unit 9 can be set in advance by calibration at the time of designing based on the relationship between the positions of the right eye and the left eye and the position of the display device 1 and the like or can be calculated by a real time process at the time of using the display device 1.

At Step S2 of FIG. 8, the control unit 9 changes a display of pixels so that two pixels of the left eye image are adjacent to each other in the X-axis direction and two pixels of the right eye image are also adjacent to each other in the X-axis direction, and then changes an area that transmits light among (the respective unit areas 150) of the barrier unit 6 depending on the display of pixels. That is, when the user U1 approaches the display device 1, the control unit 9 executes control of transmitting or blocking light in the barrier unit 6 in consideration of the view range of the right eye and the left eye of the user U1. A method of controlling light transmission or blocking in the barrier unit 6 depending on the positions of the right eye and the left eye of the user U1 and a change in a display of pixels that is performed by the control unit 9 can be set in advance by calibration at the time of designing based on the relationship between the positions of the right eye and the left eye and the position of the display device 1, the display of pixels, and the like or can be calculated by a real time process at the time of using the display device 1.

As described above, the control unit 9 determines a display of pixels of a right eye image and a left eye image displayed on the display unit 4 depending on positions of a right eye and a left eye of a user. For example, when the positions of a right eye and a left eye of a user approach the display device 1, the control unit 9 changes a display of pixels so that a predetermined number of pixels of the right eye image are adjacent to each other and a predetermined number of pixels of the left eye image are also adjacent to each other. The control unit 9 then determines a unit area that transmits light among the respective unit areas of the barrier unit 6 so that, depending on the positions of the right eye and the left eye of the user, the right eye image is viewed by the right eye of the user and the left eye image is viewed by the left eye of the user via a unit area of the barrier unit 6. For example, the control unit 9 changes a display of pixels and then a unit area that transmits light among the respective unit areas of the barrier unit 6 depending on the changed display of pixels. Therefore, the display device 1 can suppress occurrence of crosstalk caused by a back-and-forth movement of the positions of the right eye and the left eye of the user (for example, in a Z-axis direction illustrated in FIG. 8) and easily realize a display of a three-dimensional image depending on the back-and-forth movement of the positions of the right eye and the left eye of the user.

Flow of Control by Control Unit 9

Figure 15:
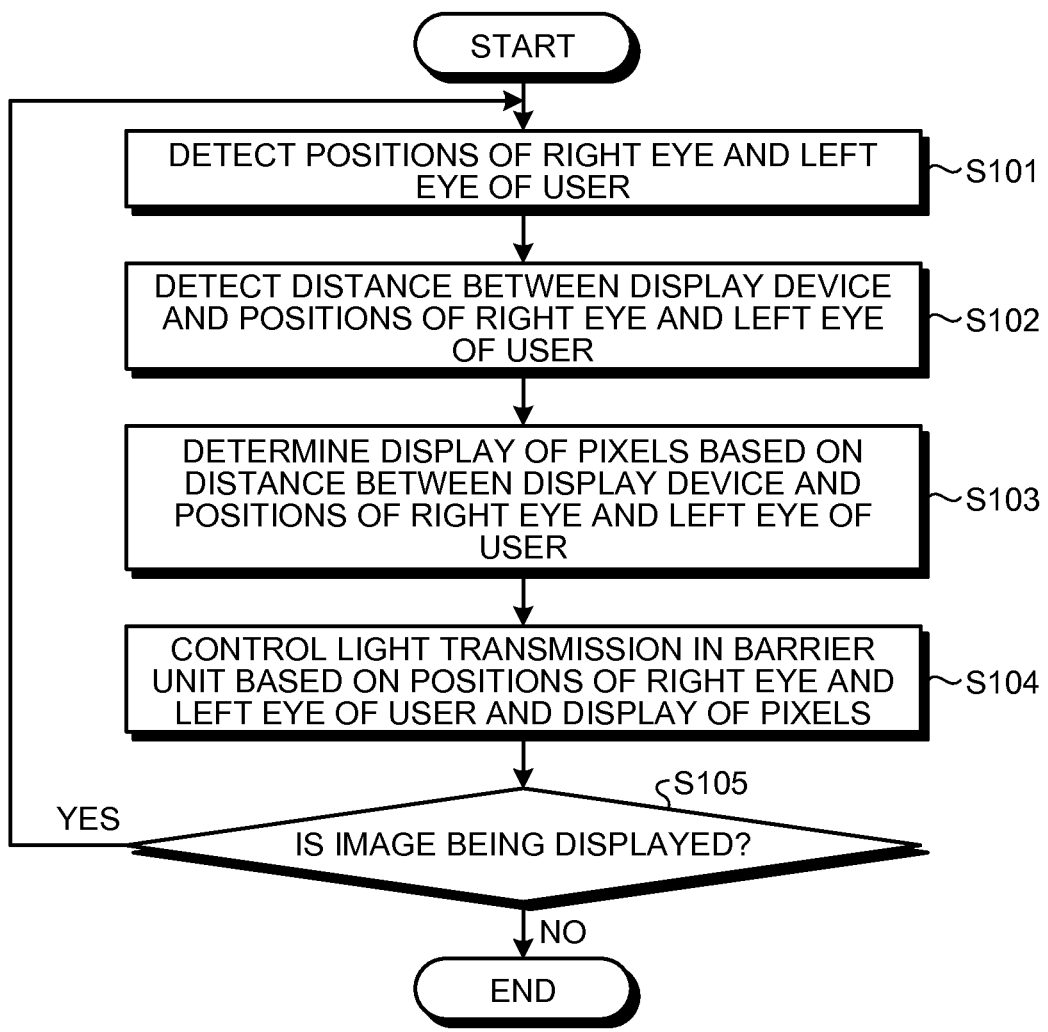
FIG. 15 is a flowchart of a flow of control by the control unit according to the embodiment.

A flow of control by the control unit 9 according to the present embodiment is explained with reference to FIG. 15. FIG. 15 is a flowchart of the flow of control by the control unit 9 according to the present embodiment. For example, the control illustrated in FIG. 15 is executed when a display of a three-dimensional image starts.

As illustrated in FIG. 15, the control unit 9 detects positions of a right eye and a left eye of a user (positions of a right eye and a left eye) depending on an image acquired from the imaging unit 8 (Step S101). Next, the control unit 9 calculates the distance between the display device 1 and the positions of the right eye and the left eye of the user (Step S102). The distance between the display device 1 and the positions of the right eye and the left eye can be the shortest distance between the positions of the right eye and the left eye of the user U1 and the barrier unit 6 or a contact distance of a direction of a line of sight of the user U1 and the barrier unit 6.

Next, the control unit 9 determines a display of pixels of a right eye image and a left eye image displayed on the display unit 4 based on the distance between the display device 1 and the positions of the right eye and the left eye (Step S103). The control unit 9 then controls light transmission and blocking in the barrier unit 6 based on the positions of the display device 1 and the right eye and the left eye and the display of pixels (Step S104). That is, the control unit 9 determines an area that transmits light and an area that blocks light among the respective unit areas 150 of the barrier unit 6.

The control unit 9 then determines whether an image is being displayed (Step S105). When it is determined that an image is being displayed (YES at Step S105), the control unit 9 returns to Step S101 and the control of FIG. 15 is continued. On the other hand, when it is determined that an image is not being displayed (NO at Step S105), the control unit 9 ends the control of FIG. 15.

Figure 16:
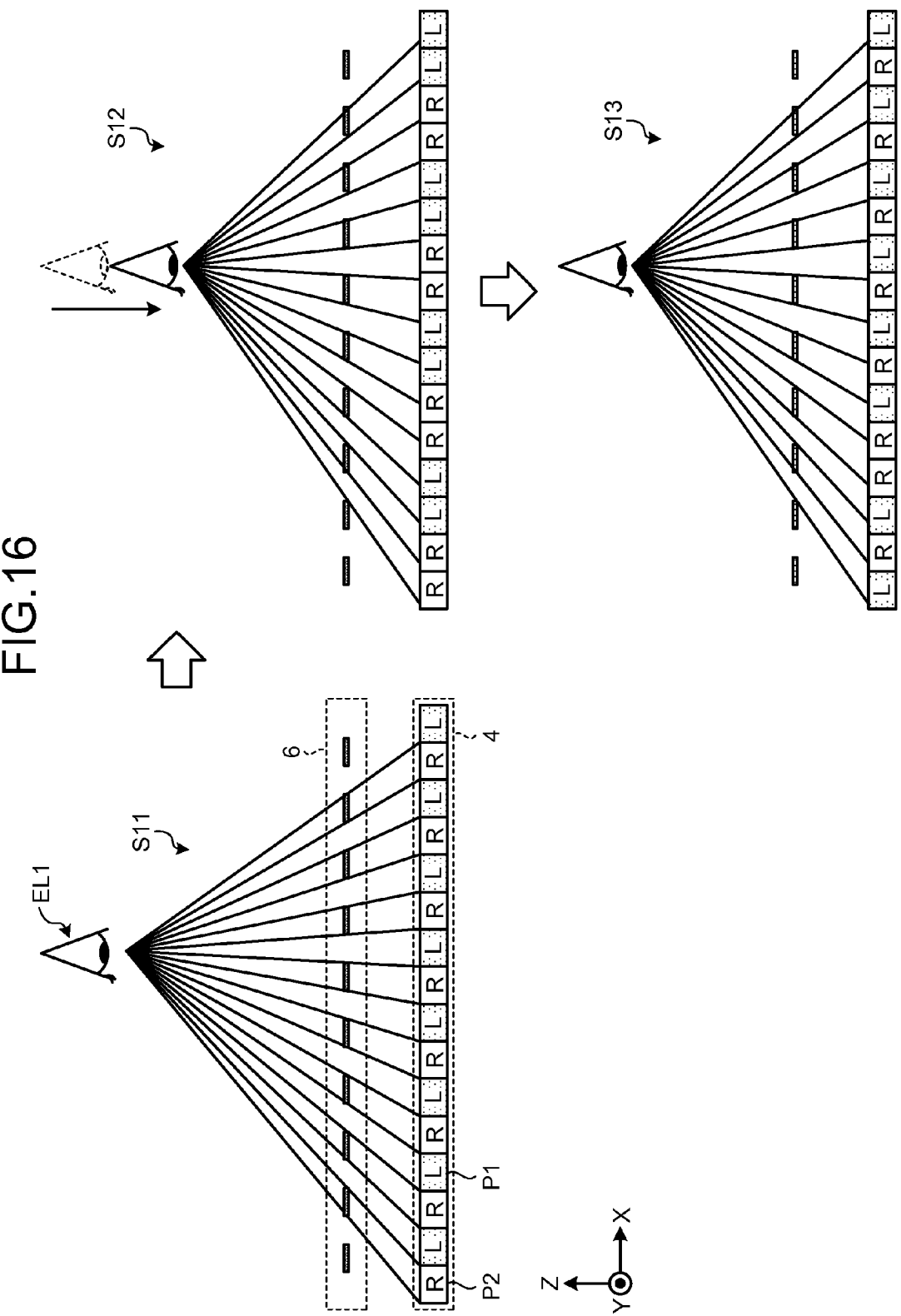
FIG. 16 illustrates an example of a fine adjustment of a display of pixels.
Figure 17:
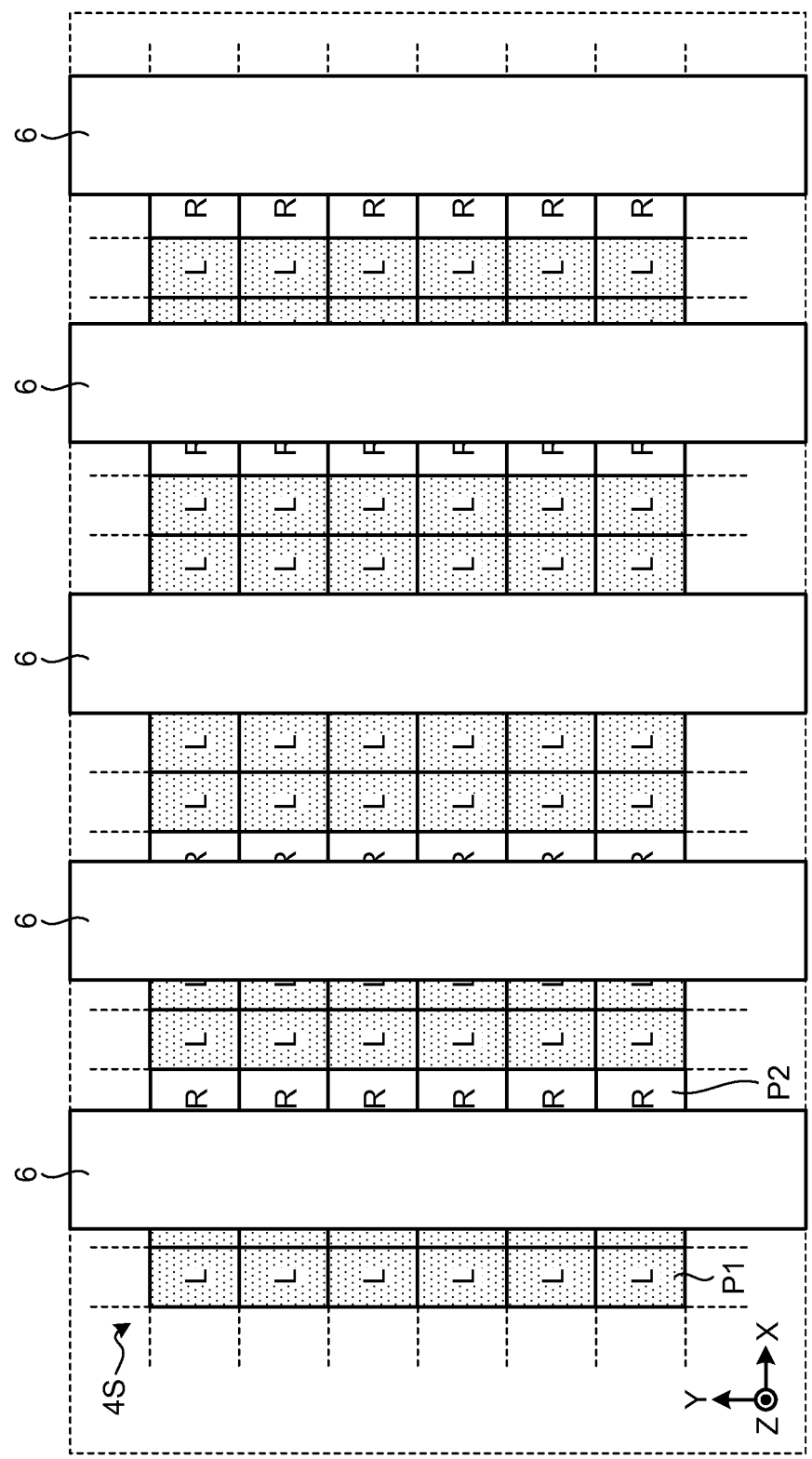
FIG. 17 illustrates an example of a range viewed by a left eye of a user.

The embodiment described above has explained an example that the control unit 9 determines a display of pixels of a right eye image and a left eye image displayed on the display unit 4 depending on positions of a right eye and a left eye of a user (the distance between the display device 1 and the positions of the right eye and the left eye), and controls light transmission and blocking in the barrier unit 6 depending on the positions of the right eye and the left eye of the user and the display of pixels. However, according to the control explained in the embodiment described above, an adjustment according to the view range of the right eye and the left eye that is changed along with a back-and-forth movement of the right eye and the left eye of the user (for example, in the Z-axis direction illustrated in FIG. 8) may not work accurately. FIG. 16 illustrates an example of a fine adjustment of a display of pixels. FIG. 17 illustrates an example of a range viewed by a left eye of a user. As illustrated at Steps S11 and S12 of FIG. 16, for example, when positions of a right eye and a left eye of a user (for example, a left eye EL1) are moved in the Z-axis direction to approach the display device 1, an adjustment according to the view range of the left eye may not work accurately as illustrated in FIG. 17 even when the control according to the embodiment described above is executed. As illustrated at Step S13 of FIG. 16, after the control according to the embodiment described above is executed, pixels that are adjacent to each other and correspond to different eyes can be replaced with each other. In this way, crosstalk can be reduced.

2. Application Example

As application examples of the present disclosure, examples in which the display device 1 described above is applied to an electronic apparatus are explained.

FIGS. 18 to 30 illustrate an example of an electronic apparatus that includes the display device according to the above embodiment. It is possible to apply the display device 1 according to the above embodiment to electronic apparatuses in any field, including a portable phone, a portable terminal device such as a smart phone, a television device, a digital camera, a laptop personal computer, a video camera, meters provided in a vehicle, and the like. In other words, it is possible to apply the display device 1 according to the above embodiment to electronic apparatuses in any field, which display a video signal input externally or a video signal generated internally as an image or a video. The electronic apparatuses include a control device that supplies a video signal to a display device to control an operation of the display device.

Application Example 1

Figure 18:
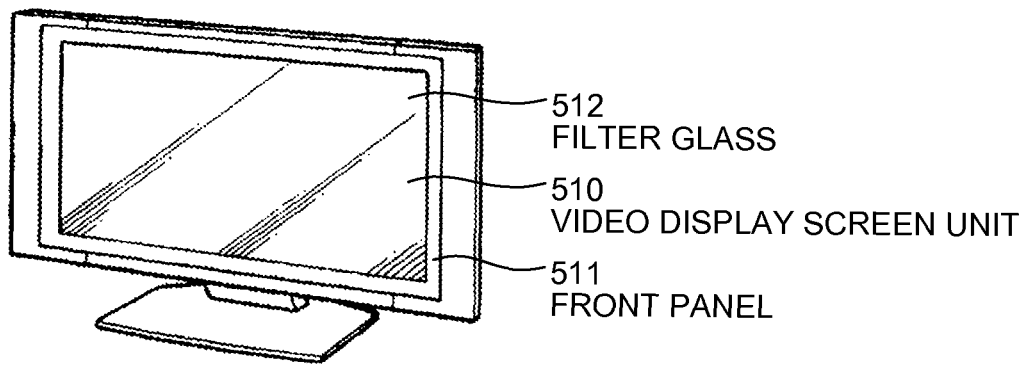
FIG. 18 illustrates an example of an electronic apparatus including the display device according to the embodiment.

An electronic apparatus illustrated in FIG. 18 is a television device to which the display device 1 according to the above embodiment is applied. This television device includes a video display screen unit 510 that includes a front panel 511 and a filter glass 512, for example. The video display screen unit 510 is the display device according to the above embodiment.

Application Example 2

Figure 19:
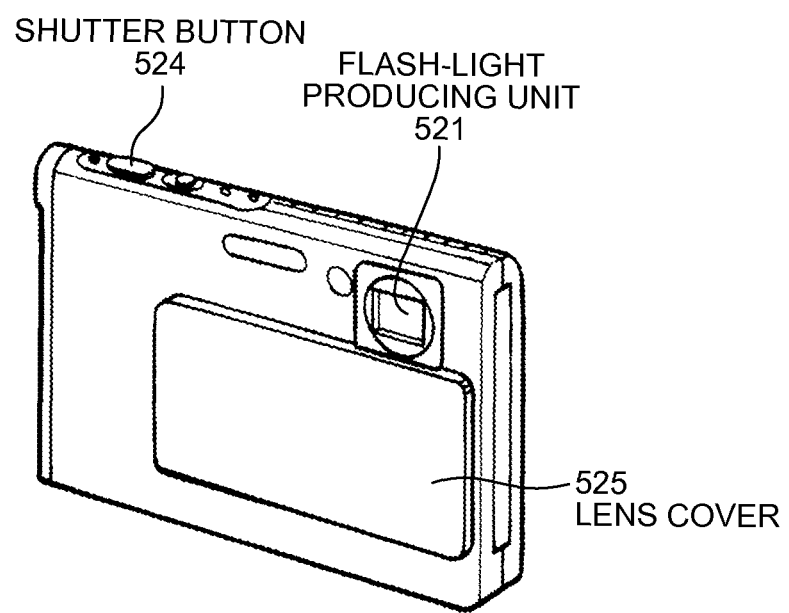
FIG. 19 illustrates another example of an electronic apparatus including the display device according to the embodiment.
Figure 20:
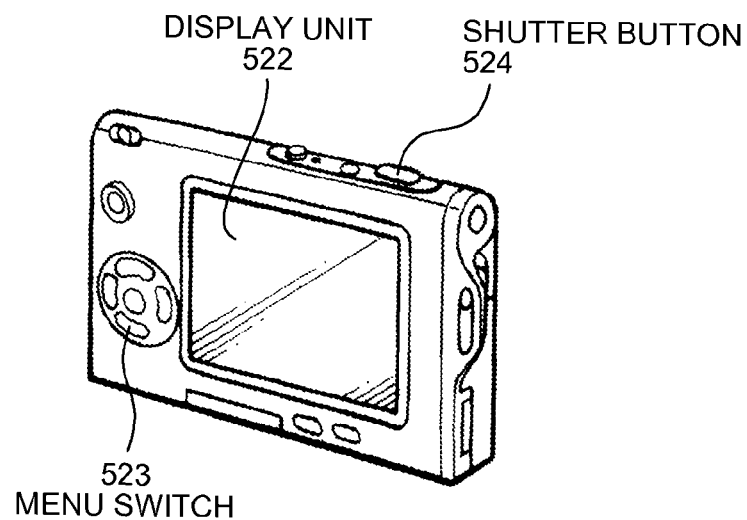
FIG. 20 illustrates another example of an electronic apparatus including the display device according to the embodiment.

An electronic apparatus illustrated in FIGS. 19 and 20 is a digital camera to which the display device 1 according to the above embodiment is applied. This digital camera includes a flash-light producing unit 521, a display unit 522, a menu switch 523, and a shutter button 524, for example. The display unit 522 is the display device according to the above embodiment. As illustrated in FIG. 19, the digital camera includes a lens cover 525, and can slide the lens cover 525 to expose an image-capturing lens. A digital camera can image light incident from its image-capturing lens to capture a digital photograph.

Application Example 3

Figure 21:
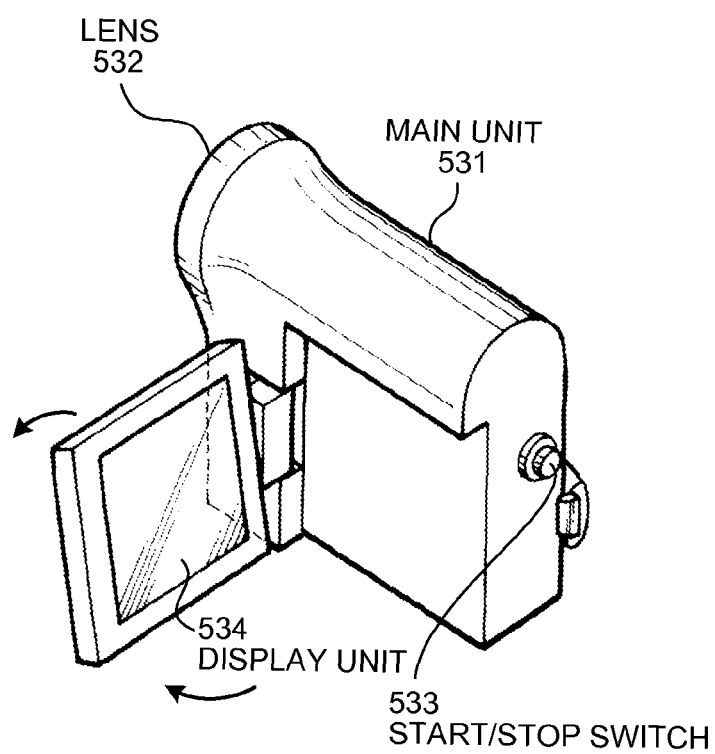
FIG. 21 illustrates another example of an electronic apparatus including the display device according to the embodiment.

An electronic apparatus illustrated in FIG. 21 is a video camera to which the display device 1 according to the above embodiment is applied, and FIG. 21 illustrates its external appearance. This video camera includes a main unit 531, a subject capturing lens 532 that is provided on the front side of the main unit 531, an image-capturing start/stop switch 533, and a display unit 534, for example. The display unit 534 is the display device according to the above embodiment.

Application Example 4

Figure 22:
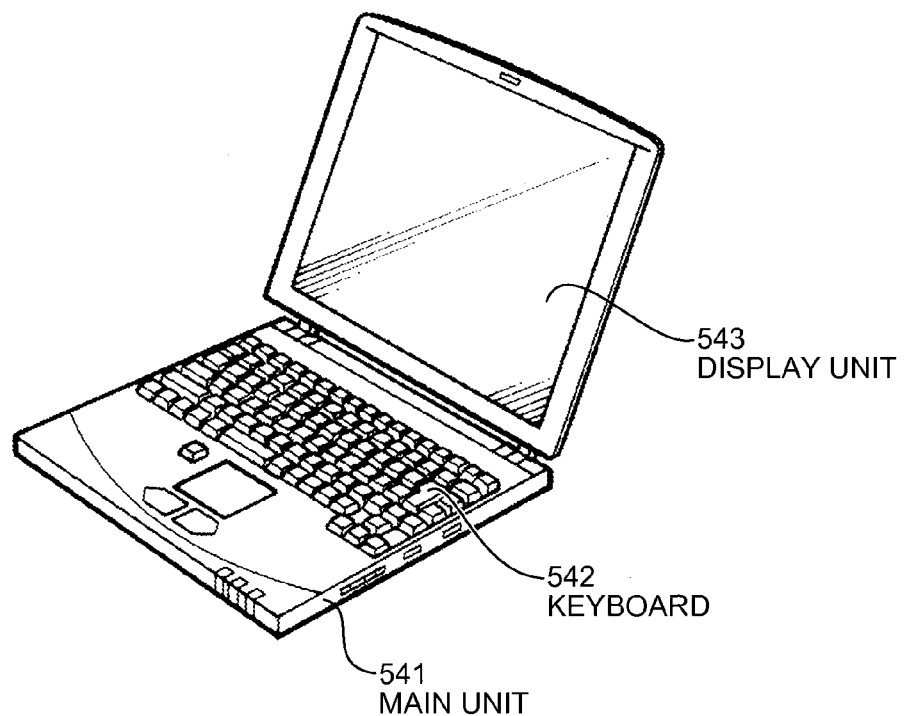
FIG. 22 illustrates another example of an electronic apparatus including the display device according to the embodiment.
Figure 23:
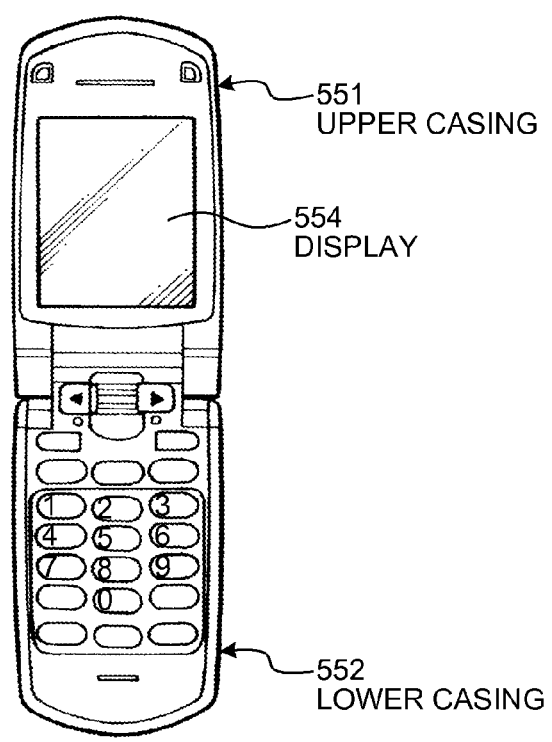
FIG. 23 illustrates another example of an electronic apparatus including the display device according to the embodiment.
Figure 24:
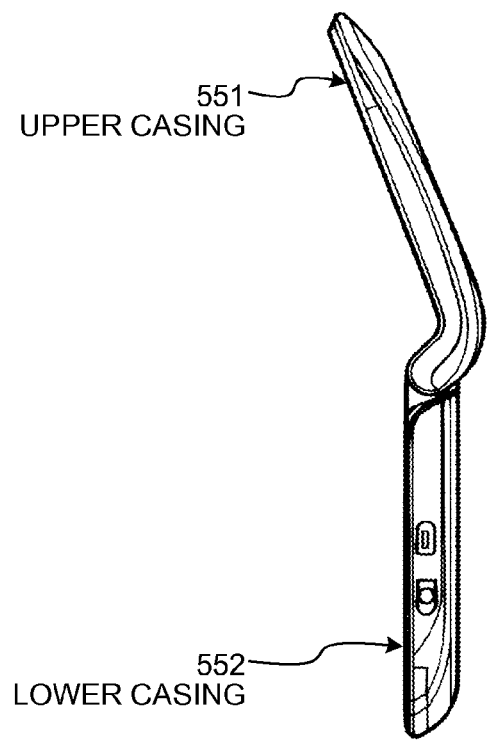
FIG. 24 illustrates another example of an electronic apparatus including the display device according to the embodiment.
Figure 25:
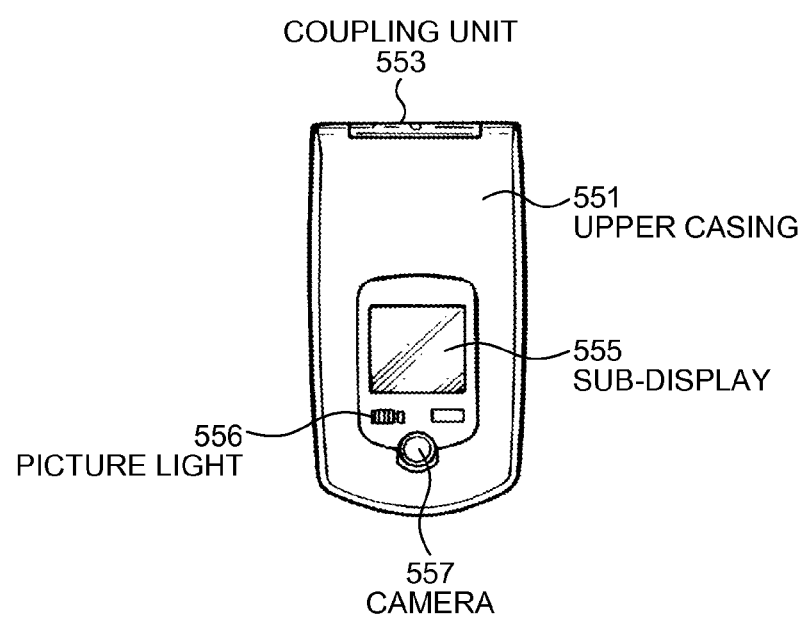
FIG. 25 illustrates another example of an electronic apparatus including the display device according to the embodiment.
Figure 28:
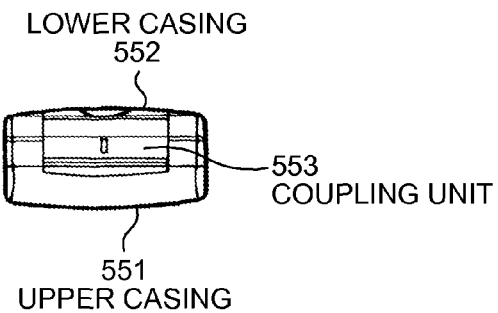
FIG. 28 illustrates another example of an electronic apparatus including the display device according to the embodiment.
Figure 29:
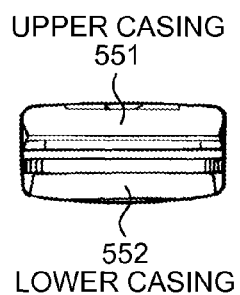
FIG. 29 illustrates another example of an electronic apparatus including the display device according to the embodiment.

An electronic apparatus illustrated in FIG. 22 is a laptop personal computer to which the display device 1 according to the above embodiment is applied. This laptop personal computer includes a main unit 541, a keyboard 542 for an operation to input text and the like, and a display unit 543 that displays an image. The display unit 543 is configured by the display device according to the above embodiment.

Application Example 5

An electronic apparatus illustrated in FIGS. 23 to 29 is a portable phone to which the display device 1 according to the above embodiment is applied. This portable phone is configured by coupling an upper casing 551 and a lower casing 552 by a coupling unit (a hinge) 553, and includes a display 554, a sub-display 555, a picture light 556, and a camera 557. The display 554 or the sub-display 555 is configured by the display device according to the above embodiment.

Application Example 6

Figure 30:
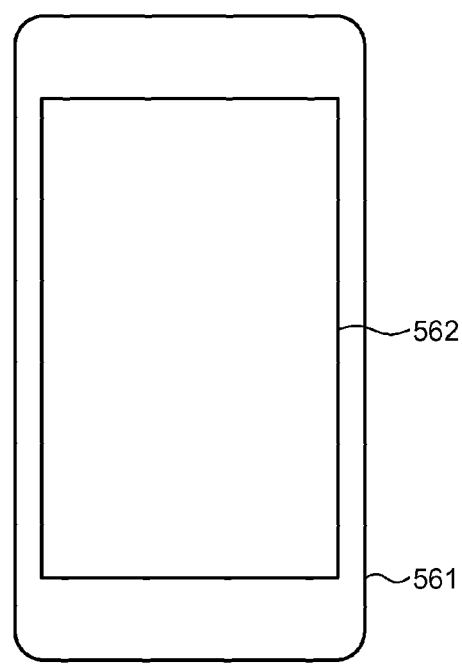
FIG. 30 illustrates another example of an electronic apparatus including the display device according to the embodiment.

An electronic apparatus illustrated in FIG. 30 is a portable information terminal that operates as a portable computer, a multi-functional portable phone, a portable computer capable of making a voice call, or a portable computer capable of other forms of communication, and that is also referred to as so-called "smart phone" or "tablet terminal". This portable information terminal includes a display unit 562 on a surface of a casing 561, for example. The display unit 562 is the display device according to the above embodiment.

The display device according to the present disclosure can easily realize a display of a three-dimensional image depending on a back-and-forth movement of positions of a right eye and a left eye of a user.

The display device according to the present disclosure changes a display of pixels of a right eye image and a left eye image and adjusts light transmission and blocking in a unit area depending on positions of a right eye and a left eye of a user, so that an occurrence of crosstalk can be suppressed. Therefore, the display device according to the present disclosure can easily realize a display of a three-dimensional image depending on a back-and-forth movement of the positions of the right eye and the left eye of the user.

ASPECTS OF PRESENT DISCLOSURE

The present disclosure includes the following aspects:
(1) A display device comprising:
a parallax adjustment unit that is arranged on a side of a surface of a display unit on which an image is displayed or on a reverse side of the surface, wherein a plurality of unit areas extending in a first direction are arranged in columns in a second direction in the parallax adjustment unit; and
a control unit that detects positions of a right eye and a left eye of a user based on an image of the user, determines a display of pixels of a right eye image and a left eye image to be displayed on the display unit depending on the detected positions of the right eye and the left eye, and determines an area that transmits light among the unit areas included in the parallax adjustment unit depending on the positions of the right eye and the left eye and the display of pixels.
(2) The display device according to (1), wherein the control unit calculates a distance between the positions of the right eye and the left eye and the display device, and when the calculated distance is shorter than a reference distance that is set in advance, the control unit changes the display of pixels so that a predetermined number of the right eye images are adjacent to each other in the second direction and a predetermined number of the left eye images are also adjacent to each other in the second direction, and changes an area that transmits light among the unit areas included in the parallax adjustment unit depending on the changed display of pixels and the positions of the right eye and the left eye.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. A display device comprising:
a parallax adjustment unit that is arranged on a side of a surface of a display unit on which an image is displayed or on a reverse side of the surface, a plurality of unit areas extending in a first direction are arranged in columns in a second direction in the parallax adjustment unit;
an imaging unit configured to capture an image of a user; and
a control unit configured to detect positions of a right eye and a left eye of a user based on the image of the user, determine a display of pixels of a right eye image and a left eye image to be displayed on the display unit depending on the detected positions of the right eye and the left eye, determine an area that transmits light among the unit areas included in the parallax adjustment unit depending on the positions of the right eye and the left eye and the display of pixels, and calculate a distance between the positions of the right eye and the left eye and the display device, wherein when the calculated distance is shorter than a reference distance that is set in advance, the control unit is configured to arrange the right eye images and the left eye images so that a first predetermined number of the right eye images are adjacent to each other in the second direction and the first predetermined number of the left eye images are also adjacent to each other in the second direction, and determine an area that transmits light among the unit areas included in the parallax adjustment unit of the single display device so as the first predetermined number of pixels of the right eye image grouped together to be observed by the right eye and the first predetermined number of pixels of the left eye image grouped together to be observed by the left eye, and wherein, when the calculated distance is equal to the reference distance, the control unit is configured to arrange the right eye images and the left eye images so that the right eye images and the left eye images are displayed alternately in the second direction or so that a second predetermined number of the right eye images are adjacent to each other in the second direction and the second predetermined number of the left eye images are also adjacent to each other in the second direction, and determine an area that transmits light among the unit areas included in the parallax adjustment unit of the single display device so as the number of pixels of the right eye image grouped together to be observed by the right eye and the number of pixels of the left eye image grouped together to be observed by the left eye, the number being set to be one or the second predetermined number that is smaller than the first predetermined number, and wherein the control unit is configured to determine the display of the number of pixels of the right eye image grouped together and the number of pixels of the left eye image grouped together, the number depending on the calculated distance.

2. The display device according to claim 1, wherein the number of the right eye images and the left eye images grouped together changes from one to two when the calculated distance is shortened from the reference distance to half of the reference distance.

\* \* \* \* \*